(12) United States Patent
Ouchida et al.

(10) Patent No.: US 9,777,661 B2
(45) Date of Patent: Oct. 3, 2017

(54) REMOTE SERVER

(71) Applicant: YANMAR CO., LTD., Osaka-shi, Osaka (JP)

(72) Inventors: Takeshi Ouchida, Osaka (JP); Shingo Eguchi, Osaka (JP); Naoki Kawakami, Osaka (JP)

(73) Assignee: YANMAR CO., LTD., Osaka (JP)

(*) Notice: Subject to any disclaimer, the term of this patent is extended or adjusted under 35 U.S.C. 154(b) by 0 days.

(21) Appl. No.: 14/914,398

(22) PCT Filed: Aug. 12, 2014

(86) PCT No.: PCT/JP2014/071313
§ 371 (c)(1),
(2) Date: Feb. 25, 2016

(87) PCT Pub. No.: WO2015/029772
PCT Pub. Date: Mar. 5, 2015

(65) Prior Publication Data
US 2016/0201590 A1 Jul. 14, 2016

(30) Foreign Application Priority Data
Aug. 28, 2013 (JP) ................. 2013-176840

(51) Int. Cl.
F02D 41/22 (2006.01)
G05B 13/02 (2006.01)
(Continued)

(52) U.S. Cl.
CPC ........... F02D 41/22 (2013.01); F02D 41/266 (2013.01); G05B 13/026 (2013.01);
(Continued)

(58) Field of Classification Search
CPC combination set(s) only.
See application file for complete search history.

(56) References Cited

U.S. PATENT DOCUMENTS 6,836,539 B2   12/2004   Katou et al.
7,171,295 B2   1/2007    Furuno et al.
(Continued)

FOREIGN PATENT DOCUMENTS

EP   2383395 A1   11/2011
EP   2416140 A1   2/2012
(Continued)

OTHER PUBLICATIONS

International Search Report corresponding to Application No. PCT/JP2014/071313; Date of Mailing: Nov. 25, 2014, with English translation.

(Continued)

Primary Examiner — Edward J Pipala
(74) Attorney, Agent, or Firm — Cantor Colburn LLP

(57) ABSTRACT

At least an embodiment may provide a remote server that can predict overheating of an engine. A remote server may receives an engine rotational speed, an engine load factor, and a cooling-water temperature. The remote server calculates a moving average of the engine load factor during a predetermine time, and calculates a correlation between the moving average of the engine load factor and the cooling-water temperature. If the correlation during a predetermined period is in the status of a predetermined difference from the correlation up to the predetermined period, the remote server predicts occurrence of overheating in a swing working vehicle that is used by a user.

4 Claims, 6 Drawing Sheets

(51) Int. Cl.
*F02D 41/26* (2006.01)
*F02D 9/02* (2006.01)
*E02F 9/20* (2006.01)
*G07C 5/00* (2006.01)
*G07C 5/08* (2006.01)

(52) U.S. Cl.
CPC .... *E02F 9/2054* (2013.01); *F02D 2009/0223* (2013.01); *F02D 2200/022* (2013.01); *G07C 5/008* (2013.01); *G07C 5/0816* (2013.01); *Y02T 10/40* (2013.01)

(56) References Cited

U.S. PATENT DOCUMENTS

| | | | |
|---|---|---|---|
| 7,433,777 | B2 | 10/2008 | Ikari et al. |
| 7,756,736 | B2 | 7/2010 | Nakayama et al. |
| 8,533,018 | B2 | 9/2013 | Miwa et al. |
| 2002/0157620 | A1 | 10/2002 | Kastner et al. |
| 2004/0199324 | A1 | 10/2004 | Li et al. |
| 2006/0047630 | A1 | 3/2006 | Furuno et al. |
| 2007/0094055 | A1 | 4/2007 | Nakayama et al. |
| 2007/0171035 | A1 | 7/2007 | Ikari et al. |
| 2009/0259507 | A1 | 10/2009 | Miwa et al. |
| 2010/0072290 | A1* | 3/2010 | Dage ............... B60H 1/00657 236/51 |
| 2013/0066583 | A1* | 3/2013 | Foussard .......... B60W 40/02 702/130 |

FOREIGN PATENT DOCUMENTS

| | | |
|---|---|---|
| JP | H10205421 A | 8/1998 |
| JP | 2002244724 A | 8/2002 |
| JP | 2004185190 A | 7/2004 |
| JP | 2005207413 A | 8/2005 |
| JP | 2007100305 A | 4/2007 |
| JP | 2007239612 A | 9/2007 |
| WO | 2005043481 A1 | 5/2005 |

OTHER PUBLICATIONS

Extended European Search Report corresponding to Application No. 14841.284.4-1603/3040545 PCT/JP2014071313; Mailing date of Mar. 17, 2017.

* cited by examiner

REMOTE SERVER

CROSS REFERENCE TO RELATED APPLICATIONS

This is the U.S. national stage of application No. PCT/JP2014/071313, filed on Aug. 12, 2014. Priority under 35 U.S.C. §119(a) and 35 U.S.C. §365(b) is claimed from Japanese Application No. 2013-176840, filed Aug. 28, 2013, the disclosure of which is also incorporated herein by reference.

TECHNICAL FIELD

The present invention relates to a technique of a remote server that predicts the occurrence of overheating of an engine.

BACKGROUND ART

Remote servers provide service to remote users. In recent years, even after marketing of a construction machine, a remote server remotely monitors an operating status of a working machine, and provides information on maintenance and the like to a user. For example, Patent Literature 1 discloses a configuration that manages a component life of a working machine with the remote server.

Patent Literature 2 discloses a configuration that determines the occurrence of overheating of the engine of a construction machine. However, the engine disclosed in Patent Literature 2 needs to detect a temperature of cylinder of the engine. Therefore, this configuration cannot be applied to an engine in which a temperature sensor is not provided in each cylinder, for example. Further, Patent Literature 1 does not disclose a configuration that the remote server predicts overheating of the engine.

CITATION LIST

Patent Literature

PTL1: JP 2007-100305 A
PTL2: JP 2005-207413 A

SUMMARY OF INVENTION

Technical Problem

An object of the present invention is to provide a remote server that can predict overheating of the engine.

Solutions to Problem

The remote server of the present invention receives information on a rotational speed of an engine, information on a load factor of the engine, and information on a temperature of cooling water of the engine. The remote server calculates a moving average of the load factor during a predetermined time, and calculates a correlation between the moving average of the load factor of the engine and the temperature of the cooling water. If the correlation during a predetermined period is in a status of a predetermined difference from the correlation before the predetermined period, the remote server predicts occurrence of overheating.

The remote server of the present invention receives information on a rotational speed of an engine, information on a load factor of the engine, and information on a temperature of cooling water of the engine. The remote server calculates an engine output from the information on the rotational speed of the engine and the information on the load factor of the engine, calculates a moving average of the engine output during a predetermined time, and calculates a correlation between the moving average of the engine output and the temperature of the cooling water. If the correlation during a predetermined period is in a status of a predetermined difference from the correlation before the predetermined period, the remote server predicts occurrence of overheating.

Preferably, the remote server receives information on an outside air temperature or information on an atmospheric pressure, and corrects the information on the temperature of the cooling water, based on an altitude calculated from the information on the outside air temperature or the information on the atmospheric pressure.

Advantageous Effects of Invention

According to the remote server of the present invention, it is possible to predict the occurrence of overheating of the engine without depending on temperature detection of each cylinder. Further, computational load of predicting the occurrence of overheating is not applied to individual engine controllers, and updating of the prediction logic is also easy.

DESCRIPTION OF EMBODIMENTS

A remote server system 100 will be described with reference to FIG. 1.

Figure 1:
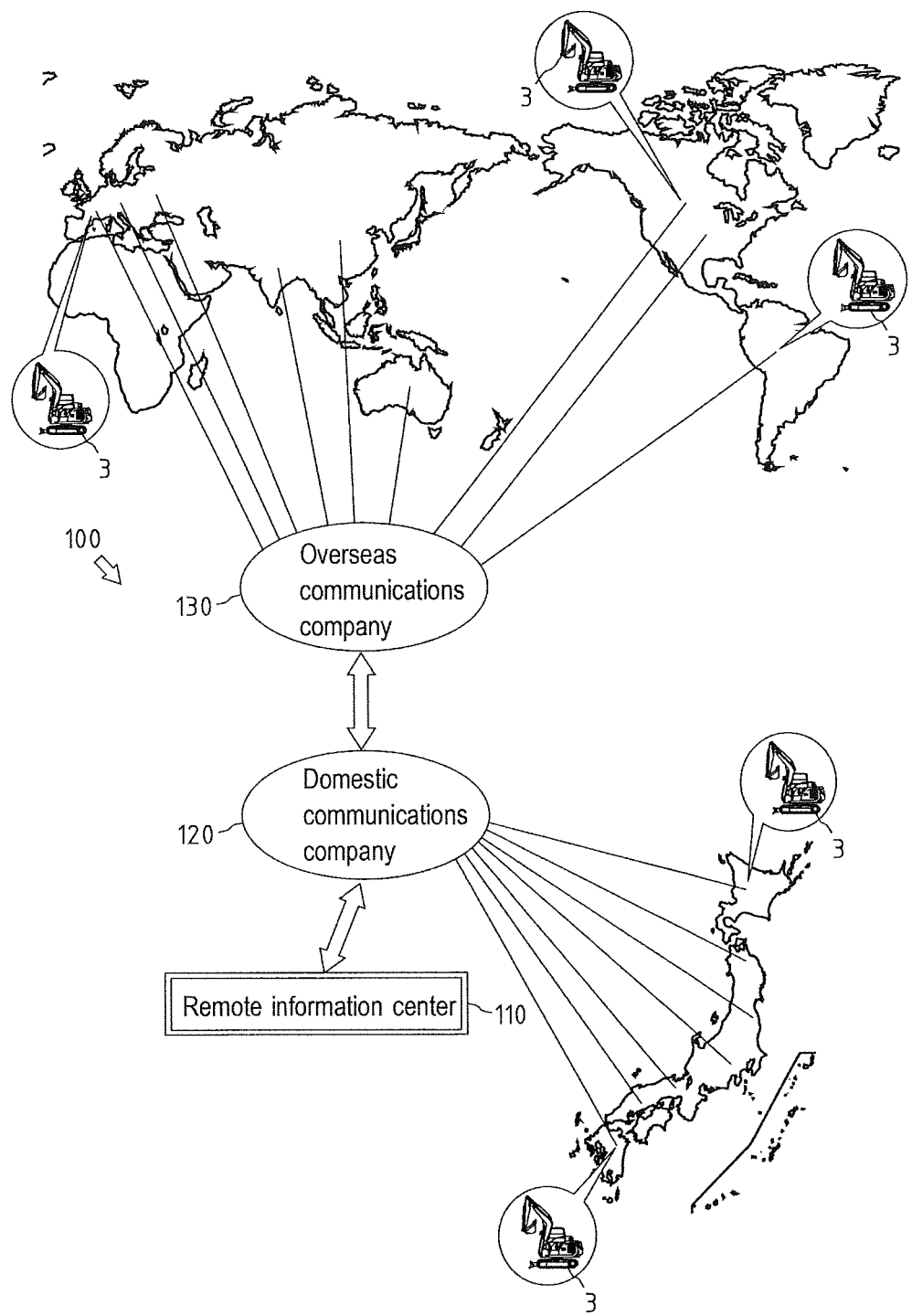
FIG. 1 is a schematic diagram showing a configuration of a remote server system.

FIG. 1 schematically shows the remote server system 100.

The remote server system 100 is a system relating to a remote server according to an embodiment of the present invention. The remote server system 100 is a system that provides service to remote users. The remote server system 100 of the present embodiment is a system that provides service from a remote information center 110 to users who use swing working vehicles 3 which are construction machines, via an overseas communications company 130 in each country of the world and a domestic communications company 120.

The remote server system 100 will be further described with reference to FIG. 2.

Figure 2:
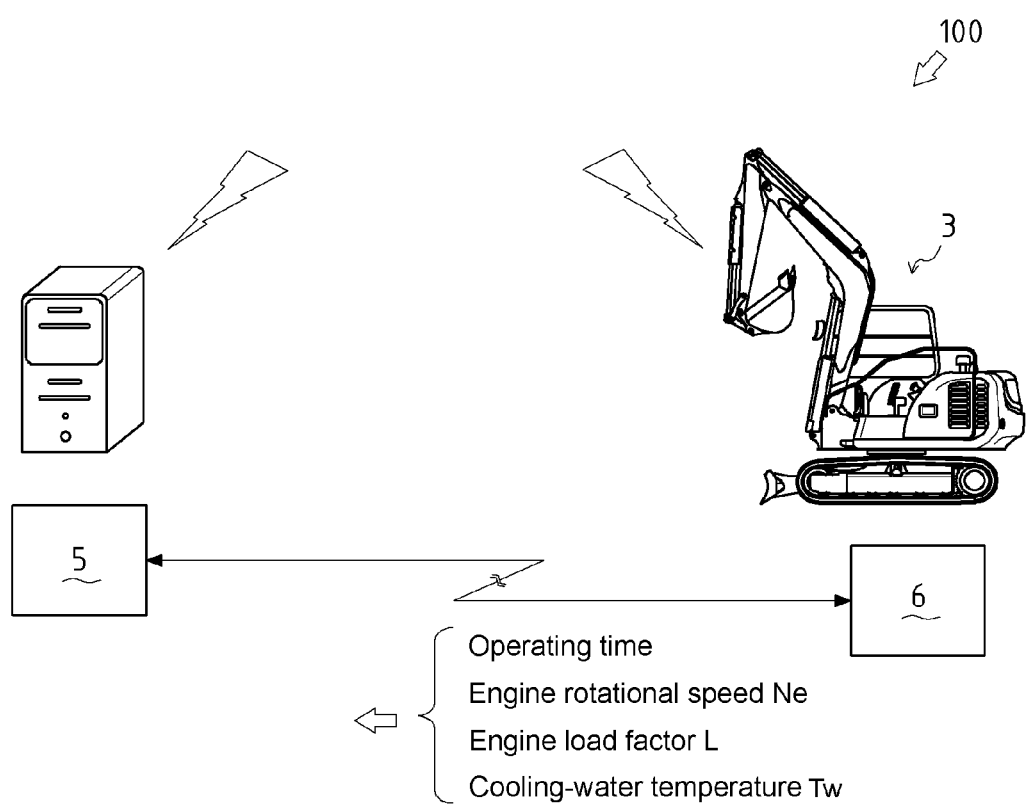
FIG. 2 is another schematic diagram showing a configuration of the remote server system.

FIG. 2 schematically shows the remote server system 100.

The remote server system 100 of the present embodiment is a system that predicts overheating of the engine (not shown) which drives the swing working vehicle 3, and the remote server system 100 alerts the user who uses the swing working vehicle 3 to the occurrence of overheating.

The remote server system 100 is configured such that a remote server 5 provided in the remote information center 110 (refer to FIG. 1) and terminal servers 6 provided in swing working vehicles 3 can communicate with each other, for example. The remote server 5 is configured to communicate with terminal servers 6 provided in many swing working vehicles 3.

In the present embodiment, it is assumed that each terminal server 6 transmits to the remote server 5, at least, year, month, and day of operation and operating hour of the swing working vehicle 3 as information on an operating day of the swing working vehicle 3, an engine rotational speed Ne as information on a rotational speed of the engine, an engine load factor L as information on a load factor of the engine, and a cooling-water temperature Tw as information on a temperature of cooling water of the engine.

It is assumed that the swing working vehicle 3 of the present embodiment has a common rail engine which is the engine. For the engine rotational speed Ne, the engine rotational speed Ne detected by the engine rotational speed sensor is transmitted to the remote server 5. For the cooling-water temperature Tw, the cooling-water temperature Tw detected by the engine-cooling-water temperature sensor is transmitted to the remote server 5.

For the engine load factor L, a ratio of an injection quantity instructed by an ECU (Engine Control Unit) to a maximum injection quantity at the engine rotational speed Ne is transmitted to the remote server 5. For example, in a mechanical governor engine, a rack position detected by a rack position sensor is the engine load factor L. In an electronic governor engine, an accelerator rotation amount detected by an accelerator opening sensor is the engine load factor L.

A correlation between the engine load factor L and the cooling-water temperature Tw will be described with reference to FIG. 3.

Figure 3:
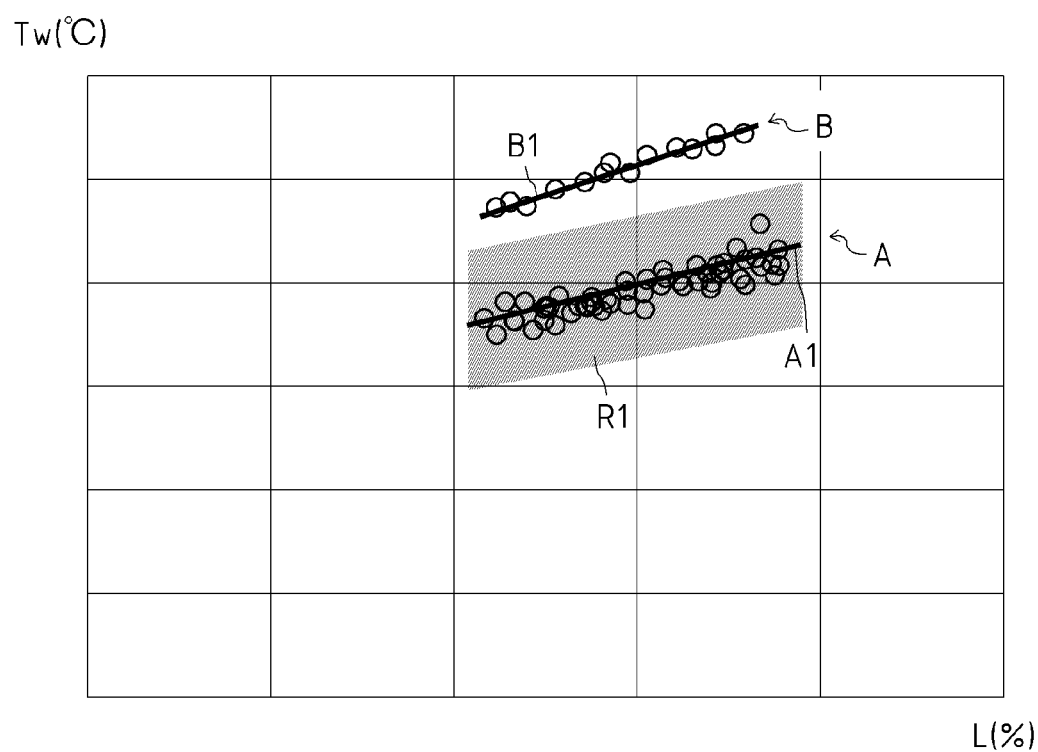
FIG. 3 is a graph showing a correlation between a load factor of an engine and a temperature of cooling water.

In FIG. 3, the horizontal axis expresses the engine load factor L, and the vertical axis expresses the cooling-water temperature Tw. The correlation between the engine load factor L and the cooling-water temperature Tw is expressed by a graph. For the engine load factor L, a moving average of each ten minutes is expressed.

For example, it is assumed that a plot group of A in the graph expresses a result of plotting correlations between the engine load factor L and the cooling-water temperature Tw of the swing working vehicle 3 up to the last operation. Further, it is assumed that a plot group of B in the graph is a result of plotting correlations between the engine load factor L and the cooling-water temperature Tw of the same swing working vehicle 3 in the operation this time.

In the plot group of A in the graph, the correlations between the engine load factor L and the cooling-water temperature Tw indicate a similar tendency. In this case, an approximation curve A1 is calculated from the result of plotting correlations between the engine load factor L and the cooling-water temperature Tw up to the last operation.

However, in the plot group of B in the graph, the correlations between the engine load factor L and the cooling-water temperature Tw indicate a tendency that the cooling-water temperature Tw is higher than the cooling-water temperature in the area of A. In this case, an approximation curve B1 is calculated from the result of plotting correlations between the engine load factor L and the cooling-water temperature Tw in the operation this time.

It is understood that the cooling-water temperature Tw of the engine is approximately proportional to the engine load factor L. The overheating of the engine refers to a status that the engine is overheated and generates malfunction. In many cases, overheating of the engine is caused by cooling capacity shortage. In many cases, the cooling capacity shortage can be detected based on the increase in the cooling-water temperature Tw.

That is, the occurrence of overheating of the engine can be prevented by detecting the occurrence of a difference in the cooling-water temperature Tw relative to the engine load factor L. For example, the plot group of B in the graph indicates a sign of the occurrence of the overheating of the engine.

Overheating predictive control S100 will be described with reference to FIG. 4.

Figure 4:
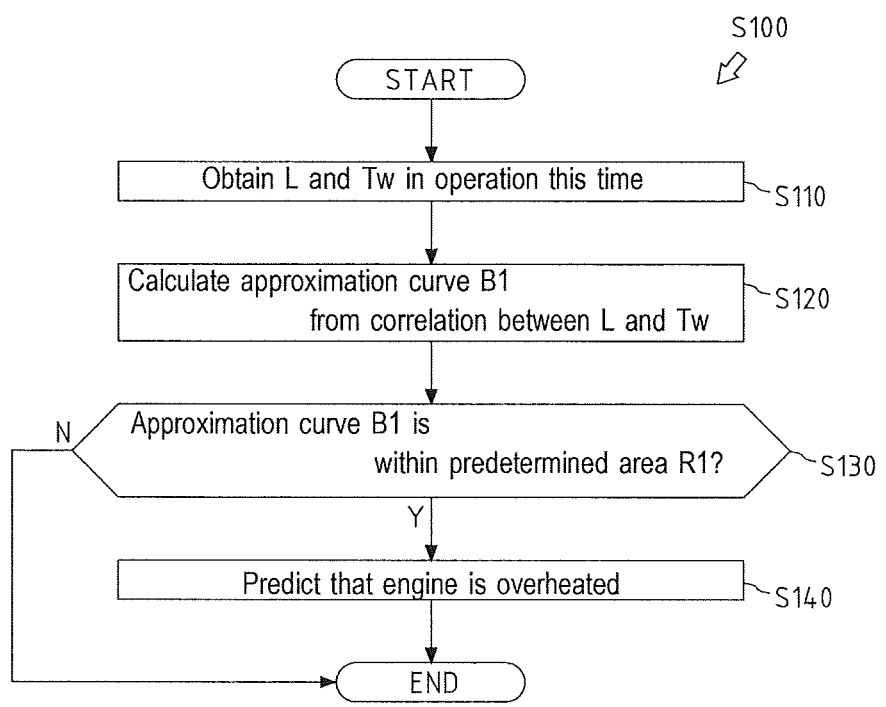
FIG. 4 is a flowchart of an overheating predictive control.

FIG. 4 shows a flow of the overheating predictive control S100 in a flowchart.

The overheating predictive control S100 is predictive control of the overheating of the engine, the control being performed by the remote server 5.

In step S110, the remote server 5 obtains as information the engine load factor L and the cooling-water temperature Tw of the swing working vehicle 3 in the operation this time. For the engine load factor L, a moving average of each ten minutes is obtained as the information.

In step S120, the remote server 5 calculates the approximation curve B1 that expresses a correlation between the engine load factor L and the cooling-water temperature Tw, from the obtained engine load factor L (moving average) and the obtained cooling-water temperature Tw.

In step S130, the remote server 5 calculates a difference between the approximation curve B1 calculated in the operation this time and the approximation curve A1 calculated in the operation up to the last time, and determines whether the approximation curve B1 is within a range of the predetermined area R1. The approximation curve A1 calculated in the operation up to the last time is limited to include the normal operation of the engine.

The range of the predetermined area R1 is a range near the calculated approximation curve A1 and is calculated as an area that includes an error.

When the approximation curve B1 is not within a range of the predetermined area R1, the remote server 5 performs step S140. On the other hand, when the approximation curve B1 is within a range of the predetermined area R1, the remote server 5 ends the overheating predictive control S100.

In step S140, the remote server 5 alerts the user that the engine of the swing working vehicle 3 has a possibility of being overheated, and ends the overheating predictive control S100. As means for alerting the user, there is considered predictive display of overheating in the operation panel of the swing working vehicle 3 via the terminal server 6, or direct reporting to the user.

Effects of the remote server 5 and the overheating predictive control S100 will be described.

The remote server 5 and the overheating predictive control S100 can predict the occurrence of overheating of the engine. Further, computational load of predicting the occurrence of overheating is not applied to the ECU of the swing working vehicle 3, and updating of the prediction logic is also easy.

A correlation between the engine output P and the cooling-water temperature Tw will be described with reference to FIG. 5.

Figure 5:
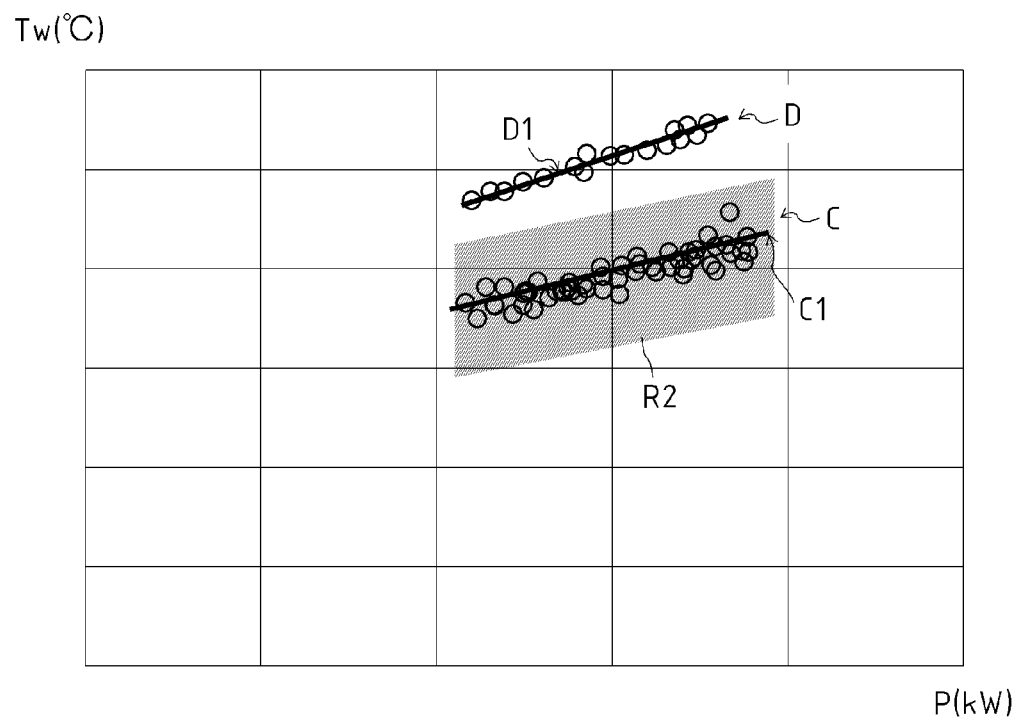
FIG. 5 is a graph showing a correlation between an engine output and a temperature of cooling water.

In FIG. 5, the horizontal axis expresses the engine output P, and the vertical axis expresses the cooling-water temperature Tw. The correlation between the engine output P and the cooling-water temperature Tw is expressed by a graph. For the engine output P, a moving average of each ten minutes is expressed.

For example, it is assumed that a plot group of C in the graph expresses a result of plotting correlations between the engine output P and the cooling-water temperature Tw of the swing working vehicle 3 up to the last operation. Further, it is assumed that an area of D in the graph is a result of plotting correlations between the engine output P and the cooling-water temperature Tw of the same swing working vehicle 3 in the operation this time.

In the plot group of C in the graph, the correlations between the engine output P and the cooling-water temperature Tw indicate a similar tendency. In this case, an approximation curve C1 is calculated from the result of plotting correlations between the engine output P and the cooling-water temperature Tw up to the last operation.

However, in a plot group of D in the graph, the correlations between the engine output P and the cooling-water temperature Tw indicate a tendency that the cooling-water temperature Tw is higher than the cooling-water temperature in the area of C. In this case, an approximation curve D1 is calculated from the result of plotting correlations between the engine output P and the cooling-water temperature Tw in the operation this time.

It is understood that the cooling-water temperature Tw of the engine is accurately proportional to the engine output P, as compared with the engine load factor L. The plot group of D in the graph indicates a sign of the occurrence of the overheating of the engine.

Another overheating predictive control S200 will be described with reference to FIG. 6.

Figure 6:
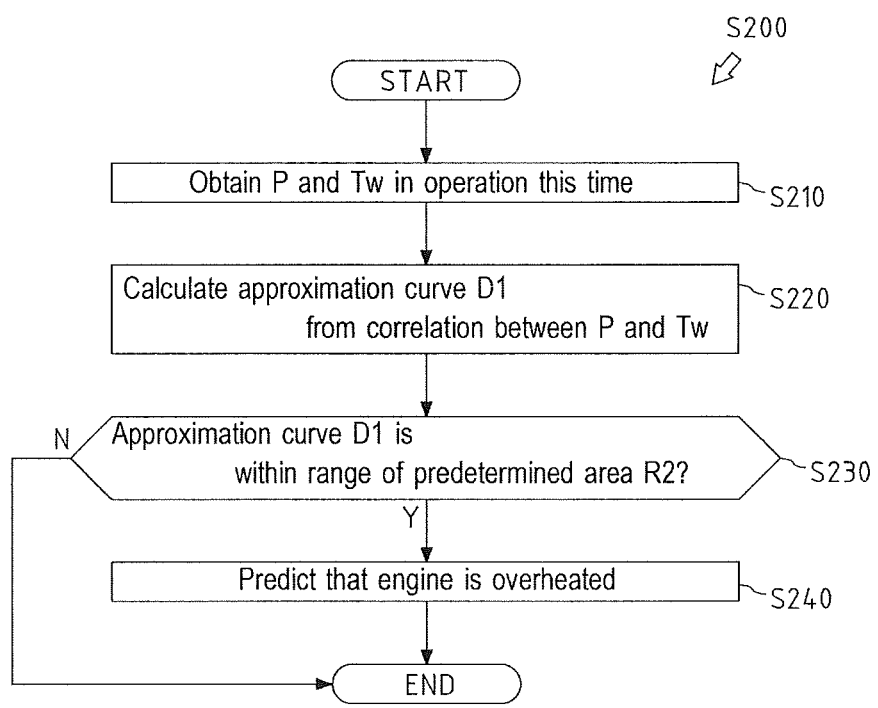
FIG. 6 is a flowchart of an overheating predictive control.

FIG. 6 shows a flow of the overheating predictive control S200 in a flowchart.

In step S210, the remote server 5 obtains as information the engine output P and the cooling-water temperature Tw of the swing working vehicle 3 in the operation up to the last time. For the engine output P, a moving average of each ten minutes is obtained as the information.

In step S220, the remote server 5 calculates the approximation curve D1 that expresses a correlation between the engine output P and the cooling-water temperature Tw from the obtained engine output P (moving average) and the obtained cooling-water temperature Tw.

In step S230, the remote server 5 calculates a difference between the approximation curve D1 calculated in the operation this time and the approximation curve C1 calculated in the operation up to the last time, and determines whether the approximation curve D1 is within a range of the predetermined area R2. The approximation curve C1 calculated in the operation up to the last time is limited to the curve that includes normal operation of the engine.

The range of the predetermined area R2 is a range near the calculated approximation curve C1 and is calculated as an area that also includes an error.

When the approximation curve D1 is not within a range of the predetermined area R2, the remote server 5 performs step S240. On the other hand, when the approximation curve D1 is within a range of the predetermined area R2, the remote server 5 ends the overheating predictive control S200.

In step S240, the remote server 5 alerts the user that the engine of the swing working vehicle 3 has a possibility of being overheated, and the remote server 5 ends the overheating predictive control S100.

Effects of the remote server 5 and the overheating predictive control S200 will be described.

The remote server 5 and the overheating predictive control S200 can accurately predict the occurrence of overheating of the engine. Further, computational load of predicting the occurrence of overheating is not applied to the ECU of the swing working vehicle 3, and updating of the prediction logic is also easy.

In the present embodiment, the cooling-water temperature Tw detected by the cooling-water temperature sensor is directly used. However, correction of the cooling-water temperature is not limited to this method. For example, the cooling-water temperature Tw may be corrected by the altitude calculated from the outside air temperature detected by the outside air temperature sensor, or from the atmospheric pressure detected by the atmospheric pressure sensor.

In the present embodiment, overheating is predicted for the user who uses the swing working vehicle 3. However, a target user is not limited to this user. For example, overheating may be predicted for the user who uses a tractor, a combine harvester, or the like.

INDUSTRIAL APPLICABILITY

The present invention can be utilized for a remote server.

REFERENCE SIGNS LIST

3: Swing working vehicle
5: Remote server
6: Terminal server
100: Remote server system

The invention claimed is:

1. A remote server that receives information on a rotational speed of an engine, information on a load factor of the engine, and information on a temperature of cooling water of the engine, wherein
   the remote server calculates a moving average of the load factor during a predetermined time, and calculates a correlation between the moving average of the load factor of the engine and the temperature of the cooling water, and if the correlation during a predetermined period is in a status of a predetermined difference from the correlation before the predetermined period, the remote server predicts occurrence of overheating.

2. The remote server according to claim 1, wherein
   the remote server receives information on an outside air temperature or information on an atmospheric pressure, and corrects the information on the temperature of the cooling water, based on an altitude calculated from the information on the outside air temperature or the information on the atmospheric pressure.

3. A remote server that receives information on a rotational speed of an engine, information on a load factor of the engine, and information on a temperature of cooling water of the engine, wherein
   the remote server calculates an engine output from the information on the rotational speed of the engine and the information on the load factor of the engine, calculates a moving average of the engine output during a predetermined time, and calculates a correlation between the moving average of the engine output and the temperature of the cooling water, and if the correlation during a predetermined period is in a status of a predetermined difference from the correlation before the predetermined period, the remote server predicts occurrence of overheating.

4. The remote server according to claim 3, wherein
   the remote server receives information on an outside air temperature or information on an atmospheric pressure, and corrects the information on the temperature of the cooling water, based on an altitude calculated from the information on the outside air temperature or the information on the atmospheric pressure.

* * * * *